United States Patent [19]

Möller et al.

[11] Patent Number: 4,692,322
[45] Date of Patent: Sep. 8, 1987

[54] PROCESS FOR PRODUCING A PRODUCT GAS CONTAINING CARBON OXIDES AND HYDROGEN FROM METHANOL

[75] Inventors: Friedrich-Wilhelm Möller, Friedrichsdorf; Walter Boll, Frankfurt am Main; Friedemann Marschner, Oberursel; Wolf-Dieter Müller, Bad Homburg, all of Fed. Rep. of Germany

[73] Assignee: Metallgesellschaft Aktiengesellschaft, Frankfurt am Main, Fed. Rep. of Germany

[21] Appl. No.: 917,997

[22] Filed: Oct. 10, 1986

[30] Foreign Application Priority Data

Oct. 18, 1985 [DE] Fed. Rep. of Germany ....... 3537152

[51] Int. Cl.$^4$ .......................... C01B 31/18; C01B 1/13
[52] U.S. Cl. ................. 423/415 A; 252/373; 423/648 R
[58] Field of Search .............. 423/648 R, 415 A; 252/373

[56] References Cited

U.S. PATENT DOCUMENTS

| | | |
|---|---|---|
| 3,450,500 | 6/1969 | Setzer et al. .......... 252/373 |
| 3,515,514 | 6/1970 | Holmes et al. ........ 252/373 |
| 4,088,450 | 5/1978 | Kosaka et al. ........ 423/648 R |
| 4,091,086 | 5/1978 | Hindin et al. ......... 252/373 |
| 4,316,880 | 2/1982 | Jockel et al. ......... 423/415 A |
| 4,613,584 | 9/1986 | Schneider et al. ..... 423/415 A |
| 4,632,774 | 12/1986 | Fox et al. ............ 252/373 |

*Primary Examiner*—John Doll
*Assistant Examiner*—Wayne A. Langel
*Attorney, Agent, or Firm*—Karl F. Ross; Herbert Dubno

[57] ABSTRACT

The methanol vapor is mixed with a gas mixture which consists mainly of carbon dioxide and hydrogen and a high-methanol mixed feedstock is thus obtained. The mixed feedstock is fed to a first catalytic breakdown zone at an entrance temperature from 300° to 400° C., which contains a zinc-containing catalyst, which is indirectly heated. An intermediate having a methanol content not in excess of 1% by volume is withdrawn at a temperature in the range from 350° to 600° C. from the first breakdown zone and is cooled. Condensed water is removed at least in part from the intermediate, which is subsequently heated to a temperature in the range from 320° to 420° C. At least one-half of the heated intermediate product is supplied to a second catalytic breakdown zone, which also contains a zinc-containing catalyst, which is indirectly heated. A precursor product is withdrawn from the second breakdown zone at temperature from 350° to 600° C. and is cooled and aqueous condensate is withdrawn from the precursor. The product, which is subsequently supplied at an entrance temperature from 20° to 80° to and is passed through a separating zone, which contains a multiplicity of selectively permeable membranes. First and second gas streams are withdrawn from the separating zones. The first gas stream contains at least 90% by volume $CO_2$ and $H_2$. The second gas stream contains at least 30% by volume CO. The first gas stream is enriched with $CO_2$ to provide a gas mixture, which is mixed with the methanol vapor.

14 Claims, 1 Drawing Figure

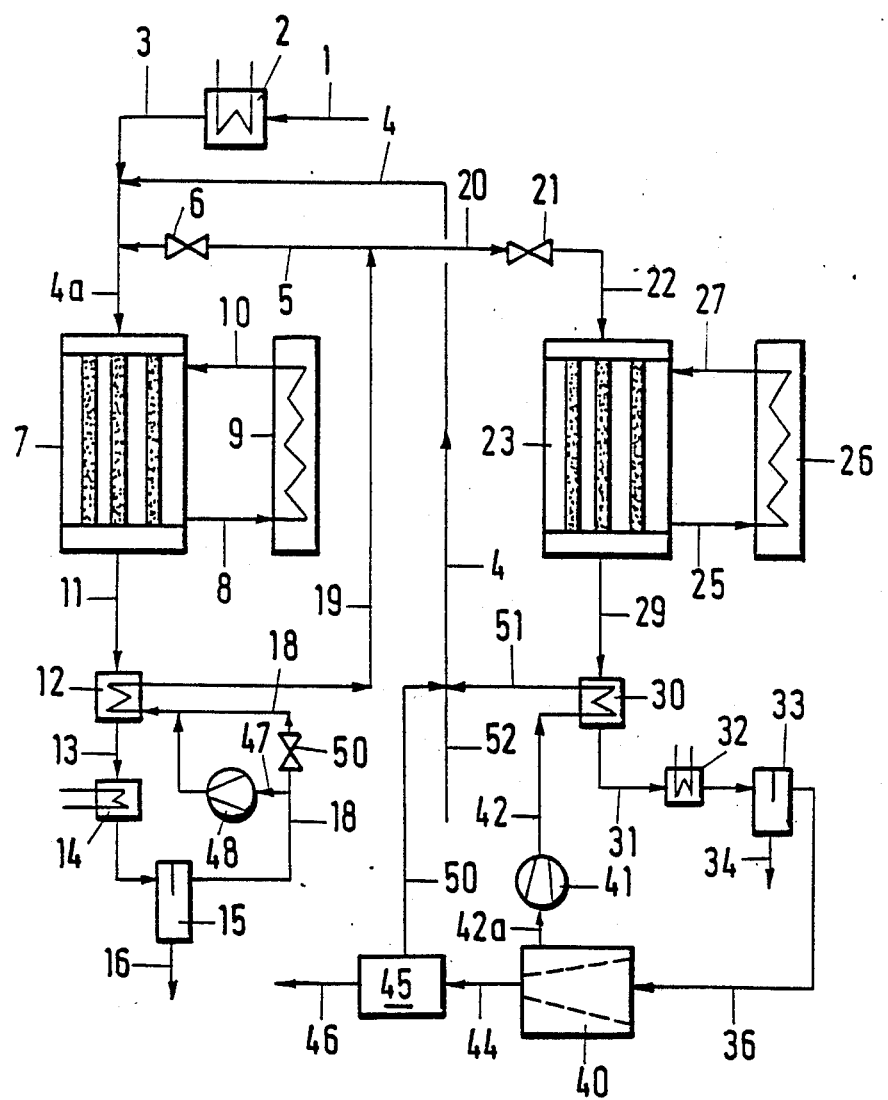

PROCESS FOR PRODUCING A PRODUCT GAS CONTAINING CARBON OXIDES AND HYDROGEN FROM METHANOL

FIELD OF THE INVENTION

Our present invention relates to a process for producing a product gas containing carbon oxides and hydrogen by a reaction of methanol vapor on an indirectly heated, zinc-containing catalyst under a pressure from 10 to 50 bars at a temperature in the range from 250° to 600° C.

BACKGROUND OF THE INVENTION

A process for reacting methanol vapor on a zinc-containing catalyst under the above-mentioned condition is known from European Patent No. 18 700 and the corresponding U.S. Pat. No. 4,316,880.

OBJECT OF THE INVENTION

It is an object of the invention to provide a process which is much more flexible than the known process and in which the volume ratio of carbon monoxide to hydrogen in the product gas can be varied over a wide range.

SUMMARY OF THE INVENTION

This is accomplished in accordance with the invention in that the methanol vapor is mixed with a gas mixture which consists mainly of carbon dioxide and hydrogen and a high-methanol mixed feedstock is thus obtained, the mixed feedstock is fed to a first catalytic reaction zone at an entrance temperature from 300° to 400° C.

An intermediate having a methanol content not in excess of 1% by volume is withdrawn at a temperature in the range from 350° to 600° C. from the first reaction zone and is cooled.

Condensed water is removed at least in part from the intermediate, which is subsequently heated to temperatures in the range from 320° to 420° C.

At least 30%, preferably at least 50%, of the heated intermediate is supplied to a second catalytic reaction zone, and a precursor product is withdrawn from the second reaction zone at temperatures from 350° to 600° C. and is cooled, an aqueous condensate being removed from the precursor product.

This precursor product is brought to a temperature of 20° to 80° C. and passed at this temperature through a separating zone, which contains a multiplicity of selectively permeable membranes.

First and second gas streams are withdrawn from the separating zone, the first gas stream containing at least 90% by volume $CO_2$ and $H_2$, the second gas stream containing at least 30% by volume CO, and the first gas stream is enriched with $CO_2$ to provide a gas mixture, which is mixed with the methanol vapor.

The gas mixture which is mixed with the methanol to provide the mixture that is supplied to the first reaction zone preferably consists of at least 90% by volume of $CO_2$ and $H_2$. Part of the $CO_2$ contained in said gas mixture comes from an extraneous source.

The first gas stream withdrawn from the separating zone may be described as a permeate. The second gas stream constitutes the product.

The composition of the two gas streams varies widely in dependence on the selected $H_2/CO$ ratio and the selected process parameters (pressure, temperature, efficiency) at the membranes. We find it to be advantageous to remove surplus carbon dioxide from the product before the latter is processed directly in a synthesis or for an isolation of its components CO and $H_2$.

In the process in accordance with the invention the mixed feedstock contains substantial quantities not only of $CO_2$ but also of hydrogen, which has a reducing activity mainly in the first reaction zone so as to effect particularly a reduction of $CO_2$ to CO. The most important reactions taking place in the catalytic cracking zones are the following:

   (1)

   (2)

   (3)

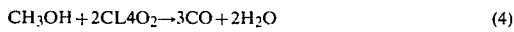   (4)

It is apparant from equation (3) that the CO content of the product gas can be increased by an increase of the content of $CO_2$ or hydrogen in the mixed feedstock.

The reaction equations show also that a low water content of the mixture that is passed through the catalytic reaction zone will also be desirable and will increase the production of CO.

From a thermodynamic aspect, the production of CO will also be increased by higher temperatures at the catalyst.

The catalysts to be used to cracking in the two reaction zones are known per se and in addition to zinc oxide in most cases contain chromium oxide. Conventional catalysts contain 50 to 90% by weight ZnO and $CrO_3$.

The high-methanol mixed feedstock supplied to the first reaction zone suitably contains 15 to 65% by volume hydrogen and may also contain 10 to 75% by volume $CO_2$. The intermediate which is fed to the second catalytic reaction zone preferably contains no water vapor in excess of 2% by volume, particularly in excess of 1% by volume.

A particularly high conversion of carbon monoxide will be obtained if 40 to 70% of the intermediate product from the first reaction zone, after a removal of substantially all water vapor, are recycled to the first reaction zone.

This recycle permits a condensation of a higher proportion of water vapor and a shifting of the equilibrium for equations (3) and (4) to higher CO contents. Without a circulation of the intermediate, the same high conversion of CO can be obtained from a given mixed feedstock only if a plurality of reaction zones and interposed condensing and reheating stages are connected in series.

If the process is to be carried out only in two stages but a recycling of the gaseous intermediate is not desired, the gas mixture must have a much higher content of supplied or recycled carbon dioxide and this usually involves higher costs. For this reason the process involving a recycling of gaseous intermediate will usually be more economical. This is also apparent from the following Examples.

BRIEF DESCRIPTION OF THE DRAWING

The above and other objects, features and advantages will become more readily apparent from the following description reference being made to the accompanying drawing, the sole FIGURE of which is a flow diagram illustrating the invention.

SPECIFIC DESCRIPTION AND EXAMPLE

The methanol to be broken down is supplied in a liquid state in the line 1 and preferably contains water not in excess of 10%. The methanol is evaporated in the heater 2 and is withdrawn from the latter in line 3. A gas mixture containing at least 90% by volume $CO_2$ and $H_2$ is added from line 4 to the methanol vapor.

Intermediate which has been recycled through the open valve 6 can be added from line 5. In line 4a at the inlet of the first breakdown reactor 7 the mixed feedstock has a temperature from 300° to 400° C., a hydrogen content from 15 to 65% by volume and a $CO_2$ content from 10 to 75% by volume.

In the reactor 7, a high-zinc granular catalyst is contained in tubes, which are heated by hot fused salt surrounding the tubes. The fused salt is circulated through the line 8, the fuel-firing heater 9 and the line 10 leading back to the reactor 7.

An intermediate which contains methanol not in excess of 1% by volume and is at a temperature in the range from 350° to 450° C. is withdrawn from the reactor 7 in line 11. The vapor-containing intermediate is first precooled in the heat exchanger 12 and is then supplied in line 13 to another cooler 14, in which the temperature is lowered below the dew point temperature of water vapor. The resulting condensate consists mainly of water and may also contain some methanol and is separated in the succeeding separator, from which it is drained in line 16.

The cooled intermediate is substantially free of water and is passed in line 18 through the heat exchanger 12, in which it is heated and from which it is withdrawn in line 19.

If a gaseous intermediate which is substantially free of water is to be recycled to the first breakdown reactor 7, the valve 50 will be closed and the gas is conducted from the separator 15 through line 47 to the compressor 48 and is compressed therein. The gas then flows to the heat exchanger 12 and leaves the same as preheated gas in line 19.

At least 30% of the preheated intermediate is conducted through the line 20, the opened valve 21 and the line 22 to the second breakdown reactor 23. Remaining intermediate from line 19 may optionally be recycled through line 5 and through the opened valve 6 to the reactor 7.

The intermediate flowing in line 22 is at a temperature in the range from 280° to 450° C. and contains water not in excess of 2% by volume, preferably not in excess of 1% by volume, and methanol not in excess of 1% by volume. In the breakdown reactor 23, the intermediate which has been received is reacted on a zinc catalyst, which is contained in tubes, and this is effected as in the reactor 7 and under the conditions stated in connection with the reactor 7. The reactor 23 also contains hot fused salt, which is used to heat the catalyst tubes and is circulated through the line 25, the fuel-firing heater 26 and the return line 27.

The precursor product leaving the second breakdown reactor 23 in line 29 is at temperatures in the range from 350° to 600° C., preferably in the range from 370° to 450° C., and has a higher CO content than the gas line 22. That precursor product is indirectly precooled in the heat exchanger 30 and is then supplied in line 31 to another cooler 32, in which the temperature is decreased below the dew point temperature of water vapor so that a condensate consisting substantially of water can be separated in the succeeding separator 33 and withdrawn through line 34.

The precursor product in line 36 is at temperatures in the range from 40° to 80° C. and contains at least 40% by volume CO and $H_2O$ in excess of 5% by volume. That precursor product is passed through a separating zone 40, which contains a multiplicity of selectively permeable membranes.

It is known that mixed gases can be separated by means of selectively permeable membranes; this is described, e.g., in Hydrocarbon Processing, February 1985, on pages 87 to 89, and in Environmental Progress, Volume 3, No. 3, August 1984, on pages 212 to 214. Membranes of cellulose acetate are preferably used in the known separating process.

Two gas streams which differ in composition are withdrawn from the separating zone 40. The first gas stream may be described as a permeate and flows through line 42a, through the compressor 41 and through the line 42 to the heat exchanger 30 and is heated in the latter. That first gas stream contains 30% by volume, preferably more than 60% by volume, $H_2$ and at least 7% by volume and preferably at least 20% by volume carbon dioxide. The second stream constitutes the raw product and leaves the separating zone 40 through line 44.

The second gas stream contains at least 30% by volume, preferably more than 45% by volume, CO, 7 to 55% by volume $H_2$ and contains no $CO_2$ in excess of 55% by volume and preferably less than 25% by volume $CO_2$.

In the succeeding $CO_2$ remover 45, the $CO_2$ is substantially completely removed from the raw product by a process that is known per se, e.g., by chemical scrubbing or by an absorption in methanol at low temperatures. The product which is available in line 46 consists virtually exclusively of CO and $H_2$ and can be used for different purposes, for instance, as a synthesis gas. The $CO_2$ which has been separated in the $CO_2$ which has been separated in the $CO_2$ remover 45 is withdrawn in line 50 and is mixed with the heated first gas stream from line 51. $CO_2$ from an extraneous source is supplied in line 52 and will always be required, particularly for a production of product gases having a $H_2$:CO volume ratio below 2.0. The gas mixture which mainly contains carbon dioxide and hydrogen is supplied in line 4 to the first breakdown reactor 7 in the manner which has been described hereinbefore.

EXAMPLES

In a plant as shown on the drawing, 1000 kg of virtually anhydrous methanol is supplied in each example in line 1 and evaporated in the heater 2. The same catalyst is used in the breakdown reactors 7 and 23 and consists of 75% by weight ZnO and 25% by weight $CrO_3$. The following tables contain data which are related to various units of equipment and lines. Some of said data have been calculated. The hydrogen yield in the separating zone 40 is defined by the ratio of the $H_2$ contents in the gases flowing in lines 42a and 36, respectively.

In Example 1 the valve 6 was closed so that the recycling line 5 was blocked. In Example 2 the valve 6 was open so that part of the intermediate conducted in line 19 was supplied in line 5 to the reactor 7 whereas the remaining intermediate was processed further in the reactor 23.

|  | Example 1 | Example 2 |
|---|---|---|
| Line 3: Methanol (sm$^3$) | 700 | 700 |
| Inlet of ractor 7: Mixed Feedstock (sm$^3$) | 4,740 | 10,325 |
| Line 11: Anhydrous gas (sm$^3$) | 5,750 | 10,980 |
| Line 16: Condensate (kg) | 202 | 319 |
| Line 22: Gas and water vapor (sm$^3$) | 5,805 | 6,040 |
| Line 34: Condensate (kg) | 128 | 101 |
| Line 36: Gas (sm$^3$) | 5,650 | 5,920 |
| Separating zone 40: Hydrogen yield | 0.75 | 0.85 |
| Line 42a: Pressure (bars) | 2.5 | 5.0 |
| Line 44: Gas (sm$^3$) | 2,450 | 2,030 |
| H$_2$: CO volume ratio | 0.80 | 0.50 |
| CO$_2$ from line 50 (sm$^3$) | 425 | 175 |
| CO$_2$ from line 52 (sm$^3$) | 415 | 520 |
| Power input (kW) |  |  |
| to compressor 41 | 370 | 305 |
| to compressor 48 | — | 65 |

The two Examples are based on the following pressure and temperature data:

|  | Example 1 | | Example 2 | |
|---|---|---|---|---|
|  | Temperature | Pressure | Temperature | Pressure |
| Inlet of reactor 7 | 350 | 25 | 380 | 25 |
| Line 11 | 400 | 24 | 450 | 24 |
| Line 16 | 50 | 22 | 50 | 23 |
| Line 22 | 340 | 22 | 260 | 25 |
| Line 29 | 400 | 21 | 450 | 24 |
| Line 24 | 50 | 20 | 50 | 23 |

The gas compositions used in Examples 1 and 2 will now be stated. At the locations marked (o) the water vapor content is less than 1% by volume and can be neglected so that it has not been taken into account in the analysis Gas compositions (in % by volume) for Example 1:

|  | Ch$_3$OH | Co$_2$ | CO | H$_2$ | CH$_4$ | H$_2$O |
|---|---|---|---|---|---|---|
| Inlet of reactor 7 | 14.79 | 25.76 | 2.03 | 56.53 | 0.02 | 0.87 |
| Line 11 | — | 15.90 | 17.39 | 61.51 | 0.10 | 5.10 |
| Line 29 | — | 13.87 | 20.86 | 61.46 | 0.10 | 3.71 |
| Line 42 | — | 11.88 | 3.02 | 83.80 | 0.01 | 1.29 |
| Line 44 | — | 17.46 | 45.73 | 36.58 | 0.23 | (o) |

Gas compositions (in % by volume) for Example 2:

|  | Ch$_3$OH | Co$_2$ | CO | H$_2$ | CH$_4$ | H$_2$O |
|---|---|---|---|---|---|---|
| Inlet of reactor 7 | 6.77 | 13.24 | 11.42 | 67.54 | 0.07 | 0.96 |
| Line 11 | — | 8.49 | 19.83 | 67.17 | 0.10 | 4.41 |
| Line 29 | — | 6.72 | 22.61 | 67.51 | 0.10 | 3.05 |
| Line 42 | — | 5.91 | 3.67 | 89.15 | 0.01 | 1.26 |
| Line 44 | — | 8.73 | 60.65 | 30.33 | 0.28 | (o) |

The foregoing Examples are typical but do not cover the entire field of application of the process in accordance with the invention. For instance, the internal streams of material can be greatly changed by a change of the membrane area in the separating zone 40 and by the selection of the backpressure in line 42a. The requirements to be met by the separating zone can be changed by the proportion of the intermediate which is recycled in line 5.

The power required of the compressor is not higher in Example 2 than in Example 1 although the product in line 44 contains much more CO. In Example 2 the energy required to recover CO$_2$ in line 50 from the raw product in the CO$_2$ remover 45 is lower because the recycling of intermediate in line 5 results in a higher conversion in the first reactor 7.

Because the process in accordance with the invention is highly flexible, the costs of producing the desired product, which is obtained in line 46, can be minimized.

We claim:

1. A process for producing a product gas containing carbon oxides and hydrogen which comprises the steps of:

(a) mixing methanol vapor with a gas mixture consisting at least predominantly of carbon dioxide and hydrogen to form a high-methanol mixed feedstock;

(b) feeding said mixed feedstock with an entrance temperature of 300° to 400° C. to a first catalytic reaction zone operated with a zinc-containing catalyst at a temperature up to about 600° and a pressure of 10 to 50 bars to produce an intermediate having a methanol content not exceeding 1% by volume;

(c) withdrawing said intermediate from said first catalytic reaction zone, (c$_1$) cooling said intermediate to condense water therein, (c$_2$) removing at least part of the condensed water from the intermediate, and (c$_3$) reheating the cooled intermediate from which condensed water has been removed to a temperature of about 320° C. to 420° C., (d) supplying at least 30% of the reheated intermediate to a second catalytic reaction zone operated with a zinc-containing catalyst at a temperature up to about 600° C. and a pressure of 10 to 50 bars to produce a precursor product at a temperature of about 350° C. to 600° C.;

(e) withdrawing said precursor product from said second catalytic reaction zone, (e$_1$) cooling the withdrawn precursor product, and (e$_2$) removing an aqueous condensate from the cooled precursor product;

(f) separating the precursor product from which said aqueous condensate has been removed into at least two gas streams by passing the precursor product through a plurality of selectively permeable membranes in a separating zone;

(g) withdrawing a first gas stream containing at least 90% by volume hydrogen and carbon dioxide from said separating zone, (g$_1$) mixing additional carbon dioxide with the withdrawn first gas stream, and (g$_2$) feeding the first gas stream with which additional carbon dioxide has been mixed to step (a) and said gas mixture thereof; and (h) withdrawing as a second gas stream from said separating zone a product stream containing at least 30% by volume carbon monoxide.

2. The process defined in claim 1 wherein at least 50% of the reheated intermediate from step (c$_3$) is supplied in step (d) to said second catalytic reaction zone.

3. The process defined in claim 2 wherein said high-methanol mixed feedstock contains 15 to 75% by volume hydrogen.

4. The process defined in claim 2 wherein said high-methanol mixed feedstock contains 10 to 75% by volume carbon dioxide.

5. The process defined in claim 2 wherein said intermediate supplied to said second catalytic reaction zone contains at most 2% by volume water vapor.

6. The process defined in claim 2, further comprising the step of:
  (i) removing at least part of the $CO_2$ contained in the second gas stream therefrom in forming said product stream.

7. The process defined in claim 6, further comprising the step of:
  (j) feeding the $CO_2$ removed in step (i) to the first gas stream of step ($g_2$) as said additional carbon dioxide.

8. A process for producing a product gas containing carbon oxides and hydrogen which comprises the steps of:
  (a) mixing methanol vapor with a gas mixture consisting at least predominantly of carbon dioxide and hydrogen to form a high-methanol mixed feedstock;
  (b) feeding said mixed feedstock with an entrance temperature of 300° to 400° C. to a first catalytic reaction zone operated with a zinc-containing catalyst at a temperature up to about 600° C. and a pressure of 10 to 50 bars to produce an intermediate having a methanol conttent not exceeding 1% by volume;
  (c) withdrawing said intermediate from said first catalytic reaction zone,
    ($c_1$) cooling said intermediate to condense water therein,
    ($c_2$) removing at least part of the condensed water from the intermediate, and
    ($c_3$) reheating the cooled intermediate from which condensed water has been removed to a temperature of about 320° C. to 420° C.;
  (d) recycling a partial stream consisting of 40 to 70% of said intermediate from which condensed water has been removed to step (a) for admixture with methanol vapor in the formation of said high-methanol feedstock;
  (e) supplying the remainder of the reheated intermediate to a second catalytic reaction zone operated with a zinc-containing catalyst at a temperature up to about 600° C. and a pressure of 10 to 50 bars to produce a precursor product at a temperature of about 350° C. to 600° C.;
  (f) withdrawing said precursor product from said second catalytic reaction zone,
    ($f_1$) cooling the withdrawn precursor product, and
    ($f_2$) removing an aqueous condensate from the cooled precursor product;
  (g) separating the precursor product from which said aqueous condensate has been removed into at least two gas streams by passing the precursor product through a plurality of selectively permeable membranes in a separating zone;
  (h) withdrawing a first gas stream containing at least 90% by volume hydrogen and carbon dioxide from said separating zone,
    ($h_1$) mixing additional carbon dioxide with the withdrawn first gas stream, and
    ($h_2$) feeding the first gas stream with which additional carbon dioxide has been mixed to step (a) and said gas mixture thereof; and
  (i) withdrawing as a second gas stream from said separating zone a product stream containing at least 30% by volume carbon monoxide.

9. The process defined in claim 8 wherein at least 50% of the reheated intermediate from step ($c_3$) is supplied in step (d) to said second catalytic reaction zone.

10. The process defined in claim 8 wherein said high-methanol mixed feedstock contains 15 to 75% by volume hydrogen.

11. The process defined in claim 8 wherein said high-methanol mixed feedstock contains 10 to 75% by volume carbon dioxide.

12. The process defined in claim 8 wherein said intermediate supplied to said second catalytic reaction zone contains at most 2% by volume water vapor.

13. The process defined in claim 8, further comprising the step of:
  (i) removing at least part of the $CO_2$ contained in the second gas stream therefore in forming said product stream.

14. The process defined in claim 13, further comprising the step of:
  (j) feeding the $CO_2$ as said additional carbon dioxide.

* * * * *